United States Patent [19]

Kurihara et al.

[11] Patent Number: 5,328,745
[45] Date of Patent: Jul. 12, 1994

[54] POLYESTER FILMS FOR MAGNETIC RECORDING MEDIUM

[75] Inventors: Hideshi Kurihara; Masahito Satoh; Tsuyoshi Nagai, all of Sagamihara; Sadayoshi Miura, Yamato; Toshifumi Osawa, Hachioji, all of Japan

[73] Assignee: Teijin Limited, Osaka, Japan

[21] Appl. No.: 996,172

[22] Filed: Dec. 23, 1992

[30] Foreign Application Priority Data

Dec. 25, 1991 [JP] Japan .................. 3-356456
Jan. 23, 1992 [JP] Japan .................. 4-010089

[51] Int. Cl.⁵ .................. G11B 5/64; G11B 5/704; B32B 5/16
[52] U.S. Cl. .................. 428/141; 428/143; 428/323; 428/481; 428/482; 428/483; 428/694 SL; 428/694 SG; 428/900; 428/910; 427/131
[58] Field of Search .............. 428/482, 481, 483, 900, 428/910, 323, 694 SL, 141, 143, 694 SG; 427/131

[56] References Cited

U.S. PATENT DOCUMENTS

| | | | |
|---|---|---|---|
| 3,787,327 | 1/1974 | Emrick | 252/316 |
| 4,548,855 | 10/1985 | Ono et al. | 428/147 |
| 4,624,892 | 11/1986 | Ishizaki et al. | 428/131 |
| 4,670,319 | 6/1987 | Katoh et al. | 428/141 |
| 5,047,278 | 9/1991 | Ono et al. | 428/141 |
| 5,181,020 | 1/1993 | Furukawa et al. | 428/900 |

FOREIGN PATENT DOCUMENTS

| | | |
|---|---|---|
| 0203604 | 12/1986 | European Pat. Off. . |
| 0504416 | 9/1992 | European Pat. Off. . |
| 52-134706 | 11/1977 | Japan . |
| 54-147010 | 11/1979 | Japan . |
| 59-84927 | 5/1984 | Japan . |
| 59-84928 | 5/1984 | Japan . |
| 59-121631 | 7/1984 | Japan . |
| 59-229316 | 12/1984 | Japan . |
| 63-278927 | 11/1988 | Japan . |

Primary Examiner—P. C. Sluby
Attorney, Agent, or Firm—Wenderoth, Lind & Ponack

[57] ABSTRACT

There is provided a polyester film useful for production of a magnetic recording medium excellent in runnability, electromagnetic conversion characteristics and storage stability. In the polyester film, a continuous thin film which contains a resin as a matrix and acts as a primer layer for a magnetic layer is coated on one surface of a support film composed of a polyester. According to one embodiment thereof, the surface of the continuous thin film has (A) small protuberances each containing particles with an average particle size of less than 0.06 micrometer as a nucleus and having a height of 13 nm or less, (B) large protuberances each containing particles with an average particle size of 0.06 micrometer or more as a nucleus and having a height of 30 nm or less, and (C) micro-protuberances composed of a matrix resin alone, the numbers, per mm² of the film, of these protuberances satisfying the formulas, $$An = 1.0 \times 10^4 - 1.0 \times 10^8 /mm^2,$$

$$Bn = 0 - 4 \times 10^4 /mm^2, \text{ and}$$
$$Cn \leq 4.0 \times 10^6 /mm^2$$

wherein $An$ is the number of the small protuberances, $Bn$ is the number of the large protuberances, and $Cn$ is the number of the micro-protuberances, the fine surface roughness $Ra^s$ of the continuous thin film portion composed of the matrix resin alone being 1.10 nm or less, and the surface roughness $Ra$ of the overall continuous thin film being 1 to 10 nm.

11 Claims, 1 Drawing Sheet

POLYESTER FILMS FOR MAGNETIC RECORDING MEDIUM

BACKGROUND OF THE INVENTION

This invention relates to a polyester film for use in a magnetic recording medium, and more specifically to a polyester film useful for production of a magnetic recording medium excellent in runnability, electromagnetic conversion characteristics and storage stability.

As a high-density magnetic recording medium, a magnetic recording medium of a ferromagnetic metallic thin film is known which is formed by physical sedimentation such as vacuum deposition or sputtering, or by plating. For example, a magnetic tape having Co deposited thereon (Japanese Laid-open Patent Application No. 147,010/1979) and a vertical magnetic recording medium using a Co-Cr alloy (Japanese Laid-open Patent Application No. 134,706/1977) are known. Such a metallic thin film formed by a thin film forming means such as deposition, sputtering or ion plating has advantages that though said film has a thickness as low as less than 1.5 micrometers, it can provide performance equal to or higher than that of a coated magnetic recording medium (a magnetic recording medium obtained by mixing a magnetic powder with an organic polymer binder and coating the mixture on a non-magnetic support) having a magnetic recording layer more than 3 micrometers in thickness.

Magnetic characteristics such as coercivity Hc and a squareness ratio of a hysteresis loop, which are static characteristics of the magnetic recording medium are thought to be less dependent on the surface condition of the non-magnetic support being used. As an example relying on such a thought, a Co-Cr multilayered structure formed by vacuum deposition is disclosed in U.S. Pat. No. 3,787,327.

In the metallic thin film-type magnetic recording medium, however, the thickness of the metallic thin film formed on the surface of the non-magnetic support is low, and the surface condition (surface unevenness) of the non-magnetic support is developed as such, as unevenness of the surface of the magnetic recording layer, which becomes a cause of noise.

From the aspect of noise, it is advisable that the smoother the surface of the non-magnetic support, the better. On the other hand, from the aspect of handling such as winding or unwinding of a base film, the surface of the base film is required to be rough because if the film surface is smooth, the sliding property between the films is poor causing a blocking phenomenon. Thus, from the aspect of electromagnetic characteristics, the surface of the non-magnetic support is required to be smooth, whereas from the aspect of handlability, the film surface is required to be rough. Therefore, a base film that meets both the contradictory qualities at the same time has been demanded.

Moreover, runnability of the metallic thin film surface is a serious problem when the metallic thin film magnetic recording medium is actually used. A usual coated magnetic recording medium formed by mixing a magnetic powder with an organic polymer binder and coating the mixture on a base film can improve runnability of the magnetic surface by dispersing a lubricant in the binder. However, in case of the metallic thin film magnetic recording medium, such a measure cannot be taken; it is very hard to stably maintain runnability, and especially runnability at a high temperature and high humidity is poor.

In order to remedy the defects, it is proposed in Japanese Patent Publication No. 30,105/1987 that very small protuberances be formed on the film surface using fine particles, a water-soluble resin and a silane coupling agent. Further, it is proposed in Japanese Patent Publication No. 30,106/1987 and Japanese Laid-open Patent Application No. 292,316/1984 that very small protuberances are formed on the film surface using fine particles and a water-soluble resin. In the above proposals, however, the fine particles are present in the trapezoidal protuberances of the water-soluble resin; it is not that the fine particles are uniformly present on the film surface. Still further, it is proposed in Japanese Patent Publication No. 34,456/1989 that a discontinuous film of a water-soluble polymer and fine particles forming a higher protuberance than said film be independently adhered to the film surface. However, according to such process, since the discontinuous film and the fine particles are not uniformly dispersed, uniformity of the film surface is poor.

BRIEF SUMMARY OF THE INVENTION

It is an object of this invention to provide, upon eliminating the defects of the prior art, a magnetic recording medium excellent in runnability, electromagnetic conversion characteristics, etc., and especially a polyester film useful for the production of a metallic thin film magnetic recording medium.

According to this invention, there is provided, as a product capable of achieving such an object, a polyester film for use in a magnetic recording medium characterized in that a continuous thin film which contains a resin as a matrix and acts as a primer layer for a magnetic layer is coated on one surface of a support film composed of a polyester, and the surface of the continuous thin film has (A) small protuberances each containing particles with an average particle size of less than 0.06 micrometer as a nucleus and having a height of 13 nm or less, (B) large protuberances each containing particles with an average particle size of 0.06 micrometer or more as a nucleus and having a height of 30 nm or less, and (C) micro-protuberances composed of a matrix resin alone, the numbers, per mm² of the film, of these protuberances satisfying the formulas, $$An = 1.0 \times 10^4 - 1.0 \times 10^8 /mm^2,$$

$$Bn = 0 - 4 \times 10^4 /mm^2, \text{ and}$$

$$Cn \leq 4.0 \times 10^6 /mm^2, \text{ or}$$

$$An \geq 1.0 \times 10^6 /mm^2,$$

$$Bn \geq 1.05 \times 10^4 /mm^2,$$

$$An \leq -3.4 \times 10^2 \cdot Bn + 13.6 \times 10^6 /mm^2, \text{ and}$$

$$Cn \leq 4.0 \times 10^6 /mm^2$$

wherein An is the number of the small protuberances, Bn is the number of the large protuberances, and Cn is the number of the micro-protuberances, the fine surface roughness $Ra^s$ of the continuous thin film portion composed of the matrix resin alone being 1.10 nm or less, and the surface roughness Ra of the overall continuous thin film being 1 to 10 nm.

DETAILED DESCRIPTION OF THE INVENTION

Figure 1:
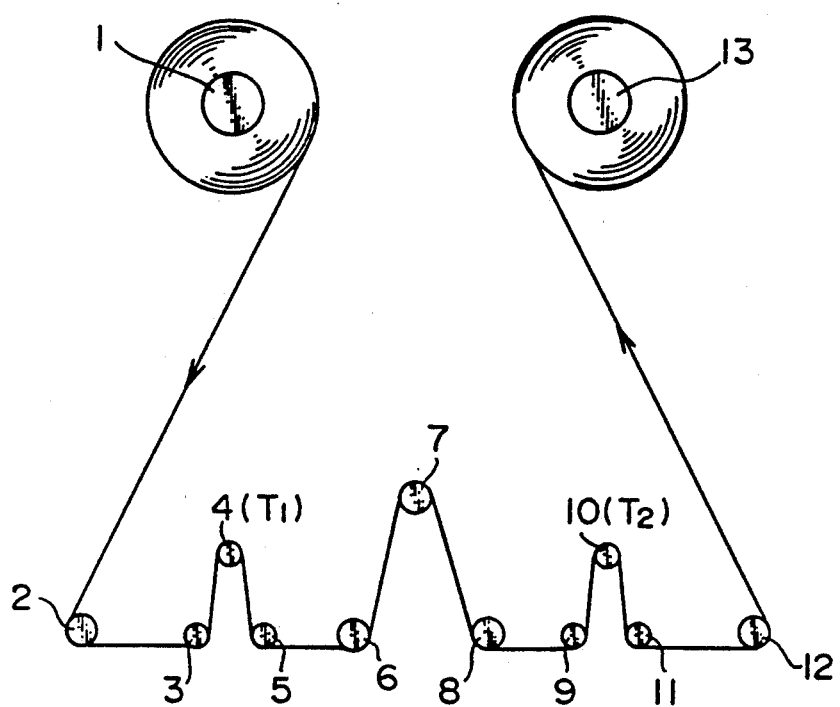
FIG. 1 is a rough sketch of a device for estimating the runability of a film.

The polyester forming the film of this invention is a saturated linear polyester formed of an aromatic dibasic acid or its ester-forming derivatives and a diol or its ester-forming derivatives. Examples of specific polyesters are polyethylene terephthalate, polyethylene isophthalate, polytetramethylene terephthalate, poly(1,4-cyclohexylenedimethylene terephthalate), and polyethylene-2,6-naphthalene dicarboxylate. Co-polymers thereof may also be used as well as blends of these materials and small amounts of other resins may also be employed.

Such a polyester can be prepared in a manner known per se. For example, polyethylene terephthalate can be prepared by subjecting terephthalic acid and ethylene glycol to esterification reaction or dimethyl terephthalate and ethylene glycol to transesterification reaction, and followed by polycondensation of the reaction product. On this occasion, a known catalyst can be used. From the aspect of film characteristics, an organotitanium compound is preferable as a catalyst for polycondensation reaction.

The organotitanium compound can be those indicated in, e.g., Japanese Laid-open Patent Application No. 278,927/1988. To be concrete, titanium alcoholates, titanium organic acid salts, reaction products of tetraalkyl titanates and aromatic polyvalent carboxylic acids or their anhydrides, etc. are available. Preferable examples thereof are titanium tetrabutoxide, titanium isopropoxide, titanium oxalate, titanium acetate, titanium benzoate, titanium trimellitate, and a reaction product of tetrabutyl titanate and trimellitic anhydride. The amount of the organotitanium compound is that the titanium atom becomes 3 to 10 mg atom % based on the acid component constituting the polyester.

The above polyester can be formed into a biaxially oriented film through the steps of melt-extrusion, biaxial stretching and orientation and heat setting in a usual manner. Biaxial stretching is conducted by, for example, sequential biaxial stretching or simultaneous biaxial stretching. The biaxially oriented polyester film has usually such crystal orientation characteristics that a heat of fusion found with a differential scanning calorimeter at a rate of temperature rise of 10° C./min under a nitrogen atmosphere is 4 cal/g or more. The thickness of the stretched film is usually 3 to 100 micrometers, preferably 4 to 50 micrometers.

In the film of this invention, the continuous thin film containing the resin as the matrix is coated on one surface of the support film composed of the polyester. Said continuous thin film acts as a primer layer for forming thereon a magnetic layer, especially a ferromagnetic thin film layer.

The surface of the continuous thin film has (A) small protuberances each containing particles with an average particle size of less than 0.06 micrometer, preferably 0.05 micrometer or less as a nucleus and having a height of 13 nm or less, preferably 12 nm or less, (B) large protuberances each containing particles with an average particle size of 0.06 micrometer or more, preferably 0.06 to 0.25 micrometer, more preferably 0.06 to 0.15 micrometer as a nucleus and having a height of 30 nm or less, preferably 25 nm or less, and (C) micro-protuberances composed of a matrix resin alone.

In one embodiment of this invention, the number (An) of the small protuberances is $1.0 \times 10^4 - 1.0 \times 10^8 / mm^2$, preferably $1.0 \times 10^5 - 1.0 \times 10^8 / mm^2$, the number (Bn) of the large protuberances is $0 - 4 \times 10^4 / mm^2$, preferably $0 - 3.8 \times 10^4 / mm^2$ and the number (Cn) of the small protuberances is $4.0 \times 10^6 / mm^2$ or less, preferably $8.0 \times 10^5 / mm^2$ or less.

In another embodiment of this invention, the number (An) of the small protuberances is $1.0 \times 10^6 / mm^2$ or more, preferably $1.6 \times 10^6 / mm^2$, the number (Bn) of the large protuberances is $1.05 \times 10^4 / mm^2$ or more, preferably $1.3 \times 10^4 / mm^2$ or more, provided the number (An) of the small protuberances and the number (Bn) of the large protuberances meet the relationship.

$$An \leq -3.4 \times 10^2 \cdot Bn + 13.6 \times 10^6 / mm^2$$

and the number (Cn) of the micro-protuberances is $4.0 \times 10^6 / mm^2$ or less, preferably $8.0 \times 10^5 / mm^2$ or less.

In both the above embodiments, the fine surface roughness $Ra^s$ of the continuous thin film portion composed of the matrix resin alone shall be 1.10 nm or less, preferably 1.00 nm or less, and the surface roughness Ra of the overall continuous thin film be 1 to 10 nm (0.001 to 0.01 micrometer), preferably 1 to 7 nm (0.001 to 0.007 micrometer).

In this invention, the matrix resin forming the continuous thin film acts also as a binder of particles forming the small protuberances (A). Examples of the matrix resin are an alkyd resin, an unsaturated polyester resin, a saturated polyester resin, a phenolic resin, an epoxy resin, an amino resin, a polyurethane resin, a vinyl acetate resin, a vinyl chloride-vinyl acetate copolymer resin, an acrylic resin, and an acryl-polyester resin. These resins may be homopolymers, copolymers or mixtures.

The acrylic resin is formed from various combinations of, for example, an acrylic ester (an alcohol residue can be a methyl group, an ethyl group, an n-propyl group, an isopropyl group, an n-butyl group, an isobutyl group, a tert-butyl group, a 2-ethylhexyl group, a cyclohexyl group, a phenyl group, a benzyl group or a phenylethyl group); a methacrylic ester (an alcohol residue is the same as above); a hydroxy-containing monomer such as 2-hydroxyethyl acrylate, 2-hydroxyethyl methacrylate, 2-hydroxypropyl acrylate, and 2-hydroxypropyl methacrylate; an amide group-containing monomer such as acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide, or N-phenylacrylamide; an amino group-containing monomer such as N,N-diethylaminoethyl acrylate or N,N-diethylaminoethyl methacrylate; an epoxy group-containing monomer such as glycidyl acrylate, glycidyl methacrylate, or allylglycidyl ether; a monomer containing a sulfonic acid group or its salt, such as styrenesulfonic acid, vinylsulfonic acid or a salt thereof (e.g., a sodium salt, a potassium salt, or an ammonium salt); a monomer containing a carboxyl group or its salt, such as crotonic acid, itaconic acid, acrylic acid, maleic acid, fumaric acid, or a salt thereof (e.g., a sodium salt, a potassium salt, or an ammonium salt); a monomer containing an anhydride such as maleic anhydride, or itaconic anhydride; and the other monomer such as vinyl isocyanate, allyl isocyanate, styrene, vinylmethyl ether, vinylethyl ether, vinyltrisalkoxysilane, alkylmaleic acid monoester, alkylfumaric acid monoester, acrylonitrile, methacrylonitrile, alkylitaconic acid monoester, vinylidene chloride, vinyl acetate, or vinyl chloride. The acrylic resin containing 50 mol % or more of a (meth)acrylic monomer component, such as a (meth)acrylic acid derivative is preferable, and the acrylic resin containing methyl acrylate is most preferable.

Such an acrylic resin can be self-crosslinked by the functional group in the molecule or crosslinked with a crosslinking agent such as a melamine resin or an epoxy compound.

Examples of the acid component constituting the polyester resin are polycarboxylic acids such as terephthalic acid, isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodiumsulfoisophthalic acid, 2-potassium sulfoterephthalic acid, trimellitic acid, trimesic acid, trimellitic anhydride, phthalic anhydride, p-hydroxybenzoic acid, and monopotassium trimellitate. Examples of the hydroxy compound component are polyhydric hydroxy compounds such as ethylene glycol, propylene glycol, 1,3-propanediol, 1,4-butanediol, 1,6-hexanediol, neopentyl glycol, 1,4-cyclohexane dimethanol, p-xylylene glycol, an ethylene oxide addition product of bisphenol A, diethylene glycol, triethylene glycol, polyethylene oxide glycol, polytetramethylene oxide glycol, dimethylolpropionic acid, glycerin, trimethylolpropane, sodium dimethylolethylsulfonate, and potassium dimethylolpropionate. From these compounds, the polyester resin can be formed in a usual manner. In case of forming an aqueous coating solution, it is advisable to use a polyester resin containing 5-sodium sulfoisophthalate or the carboxylate group. Such a polyester resin can be in a self-crosslinked form having a functional group in a molecule or be crosslinked with a curing agent such as a melamine resin or an epoxy resin.

The acryl-polyester resin means an acryl-modified polyester resin and a polyester-modified acrylic resin. Namely, this is a resin wherein the acrylic resin component and the polyester resin component are mutually bound, including a graft type, a blocked type, etc. The acryl-polyester resin can be prepared by, for example, adding a radical initiator to both ends of the polyester resin and polymerizing the acrylic monomer, or adding the radical initiator to the side chain of the polyester resin and polymerizing the acrylic monomer, or adding a hydroxyl group to the side chain of the acrylic resin and reacting it with a polyester containing an isocyanate group or a carboxyl group in the end to form a comb-like polymer.

The particles which are dispersed in such a resin to form the nucleus of the small protuberances, are organic fine particles of polystyrene, polymethyl methacrylate, a methyl methacrylate copolymer, a crosslinked methyl methacrylate copolymer, polytetrafluoroethylene, polyvinylidene fluoride, polyacrylonitrile, and benzoguanamine; and inorganic fine particles of silica, alumina, titanium dioxide, kaolin, talc, graphite, calcium carbonate, feldspar, molybdenum disulfide, carbon black, and barium sulfate. They may be formed into an aqueous dispersion with an emulsifying agent, etc., or added to an aqueous solution in the form of a fine powder.

The continuous thin film can be formed on the surface of the polyester film by a method in which a resin coating solution, preferably an aqueous coating solution, containing particles for forming small protuberances is coated on the film surface during production of the polyester film, and solidified via drying, or a method in which the resin coating solution containing said particles is coated on the biaxially oriented polyester film, and solidified via drying, the former being preferable. The coating solution can contain a surface active agent that eases coating.

It is advisable that the ratio of the particles and the matrix resin (binder) is determined depending on the aforesaid surface characteristics, and based on the overall solids content, the particles are 1 to 40% by weight and the matrix resin is 20 to 95% by weight. When the particles are smaller than the above, it is impossible to uniformly apply the given amounts of the small protuberances to the coated film. On the other hand, when the particles are larger than the above, dispersibility becomes poor, and it is hard to uniformly apply the given amounts of the small protuberances. When the matrix resin is smaller than the above, adhesion of the coated film to the polyester film decreases. Meanwhile, when it is larger than the above, blocking resistance decreases.

Any known coating method is available. Examples thereof are a roll coating method, a gravure coating method, a roll brushing method, a spray coating method, an air knife coating method, a dipping method, and a curtain coating method. They may be used either singly or in combination.

By such a coating treatment, the micro-protuberances (C) composed of the resin alone are also formed together with the small protuberances (A) on the surface of the continuous thin film (primer layer).

The large protuberances (B) on the surface of the continuous thin film, though their presence is optional in this invention, can be those formed by containing in a resin coating solution the particles with the average particle size of 0.06 micrometer or more together with the particles for forming the small protuberances, or those resulting from surface protuberances of the film itself formed by adding to the polyester the particles with the average particle size of 0.06 micrometer or more, the latter being preferable. As the particles for forming the large protuberances, a well-known surface roughening material of a polyester film, such as calcium carbonate, kaolinite, titanium dioxide, silica, alumina, or the like can be taken.

The surface roughening material may be added, if a good dispersed state is obtained in the polyester film, during preparation of the polyester or to a molten polymer with a single-screw or twin-screw extruder or an extruder having a vent mechanism in forming the polyester film. When adding said material during preparation of the polyester, it is especially preferable in the aspect of dispersibility of particles that said material is added before the start-up of the polymerization of the polyester or during the polymerization reaction. In case of the addition before the production of the polyester or during the polycondensation, it is advisable that the particles are added in the form of a slurry in a diol, preferably ethylene glycol or 1,4-butanediol. The suitable concentration of the slurry is about 0.5 to 20% by weight. Means of dispersing the particles in a dispersion medium such as ethylene glycol, or the like are, for example, a high-speed dispersing machine, a sand mill and a roll mill. When a phosphorus-containing compound such as phosphoric acid or sodium hexametaphosphate, a nitrogen-containing compound such as tetraethylammonium hydroxide or hydroxylamine, an alkali compound, a cationic, anionic, ampholytic or nonionic surface active agent, or a dispersant such as a water-soluble polymer is used in dispersing the particles, dispersibility of the surface roughening agent in the slurry and the polymer further increases, and this is desirable.

When a magnetic layer, especially a metallic thin film magnetic layer is formed on the thus formed continuous thin film, noise remarkably decreases, making it possible to provide a magnetic recording medium quite excellent in noise level and excellent in runnability of the metallic thin film surface and storage stability.

In this invention, it is advisable that a continuous thin film forming a sliding surface is coated on the other surface of the polyester film, i.e., the surface opposite to the surface having the continuous thin film as the primer of the magnetic layer. The thin film contains a cellulose resin and particles having an average particle size of 0.15 micrometer or less, preferably 0.01 to 0.1 micrometer, the surface roughness Ra being 2 to 10 nm (0.002 to 0.01 micrometer), preferably 3 to 9 nm (0.003 to 0.009 micrometer).

Examples of the cellulose resin are ethyl cellulose, methyl cellulose, acetyl cellulose, acetoacetyl cellulose, nitrocellulose, carboxylated cellulose, carboxymethyl cellulose, and cellulose acetate butyrate. The use of the cellulosic resin enables a large number of fine pleats to be formed on the surface of the coated film.

Examples of the particles are fine particles of organic materials such as polystyrene, polymethyl methacrylate, a methyl methacrylate copolymer, a crosslinked methyl methacrylate copolymer, polytetrafluoroethylene, polyvinylidene fluoride, polyacrylonitrile, and benzoguanamine; and fine particles of inorganic materials such as silica, alumina, titanium dioxide, kaolin, talc, graphite, calcium carbonate, feldspar, molybdenum disulfide, carbon black and barium sulfate. The particles may be formed in an aqueous dispersion with an emulsifying agent or fine particles that can be added to an aqueous solution.

The cellulosic resin and the particles serve to promote uniform formation of micro-protuberances of the coated film itself and to reinforce the coated film by the particles themselves, and impart excellent slipperiness to the film in addition to improvements in blocking resistance, decrease in frictional force and scratch resistance due to the above two properties, of the coated film-forming resin.

It is advisable that the resin forming the slippery thin film is excellent in blocking resistance and decrease in frictional force. Examples of said resin are, like the aforesaid desirable examples of the matrix resin, an acrylic resin, a polyester resin and an acrylpolyester resin.

It is desirous that the proportions of the components forming the sliding surface, i.e., the thin film-forming resin (component a), the cellulose resin (component b) and the particles (component c) are determined depending on the surface characteristics. Based on the total solids content, the proportion of component a is 30 to 80% by weight, the proportion of component b is 1 to 50% by weight, and the proportion of component c is 5 to 40% by weight. When the proportion of component a is lower, adhesion of the polyester film to the coated film decreases. When it is higher, blocking resistance or sliding property decreases. When the proportion of component b is lower, the pleats of the coated film become less and processability decreases. When it is higher, the surface is too rough. When the proportion of component c is lower, sliding property decreases. When it is higher, particles are liable to drop from the coated surface.

The slippery coated film in this invention may be formed, like the continuous thin film layer (primer layer), either after or during preparation of the polyester film. It is preferred to conduct said formation during preparation of the polyester film. For example, the slippery coating solution is preferably coated on the surface of the polyester film before completing orientation and crystallization.

The polyester film before completing orientation and crystallization includes an unstretched film obtained by heat-melting and extruding the polyester and directly forming the extrudate into a film, not yet stretched; a monoaxially stretched film obtained by stretching the unstretched film either longitudinally or transversely; and a biaxially stretched film wherein at least one stretching is stretching at a low stretch ratio and further stretching in the same direction is required (said film is a biaxially stretched film after finally restretched longitudinally and/or transversely but before completing orientation and crystallization.

The film of this invention is desirably produced according to a so-called in-line coating system comprising coating the coating solution of the above composition, especially, the aqueous coating solution onto the unstretched or at least monoaxially stretched film before completing orientation and crystallization, and then conducting longitudinal stretching and/or transverse stretching and heat-setting. At that time, in order that the coated film can be smoothly formed on the surface of the polyester film before completing orientation and crystallization, it is advisable that corona discharge treatment is applied to the film surface as pretreatment, or the surface active agent chemically inactive to the coating composition is conjointly used with said composition. Such a surface active agent helps decrease the surface tension of the coating solution, especially the aqueous coating solution below 40 dyne/cm and promotes wetting of the polyester film. Examples of the surface active agent are anionic and nonionic surface active agents such as a polyoxyethylenealkylphenyl ether, a polyoxyethylene aliphatic acid ester, a sorbitan fatty acid ester, a glycerin fatty acid ester, an fatty acid metallic soap, an alkyl sulfate, an alkyl sulfonate, and an alkyl sulfosuccinate. Moreover, it is possible to add the other additives such as an antistatic agent, a UV absorber and a lubricant unless losing the effects of this invention.

In this invention, the solids content of the coating solution, especially the aqueous coating solution is usually 30% by weight or less, preferably 15% by weight or less. The viscosity thereof is usually 100 cps or less, preferably 20 cps or less. The amount of the coating solution is about 0.5 to 20 g, preferably about 1 to 10 g per $m^2$ of the running film. In other words, the coating solution is coated on the finally obtained biaxially oriented film in an amount of about 0.001 to 1 g, preferably about 0.005 to 0.3 g (as a solids content) per $m^2$ of the film.

The coating method can be any known coating method as in case of forming the continuous thin film (primer layer). Examples of the coating method are a roll coating method, a gravure coating method, a roll brushing method, a spray coating method, an air knife coating method, a dipping method, and a curtain coating method. They may be used either singly or in combination.

In accordance with the preferable method of this invention, the coating solution is coated on the film just after the longitudinal monoaxial stretching, and the film is led to a tenter for transverse stretching and heat-setting. In that case, the area of the coated product is enlarged upon stretching the film in the state of the unsolidified coated film, and the coated product is heated to volatilize the medium. The resulting product is converted into a thin solid continuous coated film layer on the surface of the biaxially stretched film and strongly solidified on the surface of the biaxially stretched film. The stretching and the heat treatment are carried out at a temperature of about 80° to about 240° C. The heat treatment is usually conducted for about 1 to about 20 seconds.

The metallic thin film magnetic recording medium using the polyester of this invention can be formed by a method known per se, e.g., a method described in Japanese Laid-open Patent Application Nos. 147,010/1979 and 134,706/1977. A vacuum deposition method, an ion plating method and a sputtering method are preferable.

The polyester film of this invention can provide a magnetic layer, especially a metallic thin film magnetic layer which is smooth and excellent in runnability and storage stability, much decreases noise and is useful to produce a magnetic recording medium, especially a metallic thin film magnetic recording medium quite excellent in noise level and excellent in runnability of a magnetic surface, especially a metallic thin film surface.

The following Examples and Comparative Examples illustrate this invention more specifically. By the way, parts in said Examples are all on the weight basis.

The properties in said Examples were measured as follows.

(1) Intrinsic viscosity $[\eta]$:

Measured at 35° C. in an o-chlorophenol solvent.

(2) Average particle size:

Regarding the particles having the average particle size of less than 0.06 micrometer and forming the small protuberances (A), the average particle size is indicated with an "equivalent spherical diameter" of particles in the point of 50 wt. % of all particles found by a light scattering method.

Regarding the particles having the average particle size of 0.06 micrometer or more and forming the large protuberances (B), the average particle size is indicated with an "equivalent spherical diameter" of particles in the point of 50 wt. % of all particles found by a light transmitting-type centrifugal sedimentation method.

(3) Number of protuberances:

The number of protuberances on the surface of the film is measured by a scanning-type electron microscope. Namely, the number of the small protuberances (A) is found with 20,000 to 50,000×magnification, that of the large protuberances (B) with 5,000 to 10,000×magnification, and that of the micro-protuberances with 10,000 to 20,000×magnification, respectively.

(4) Height of protuberances:

The height of the small protuberances (A) on the film surface is measured with a three-dimensional roughness measuring instrument (a scanning-type tunnel microscope) utilizing a tunnel current. Using a sample obtained by uniformly depositing gold having a thickness of 200 Å on the surface of the film, the height of the small protuberances is measured in an ambient atmosphere under such conditions that a voltage applied between the surface being measured and a metallic probe is 0.8 V and a tunnel voltage is 0.5 mA.

The height of the large protuberances (B) is measured with a feeler-type surface roughness measuring instrument. Namely, it is found from a surface roughness curve measured with a cut-off value of 0.008 mm and a longitudinal magnification of 1,000,000×.

(5) Fine surface roughness $Ra^s$:

Using a sample obtained by uniformly depositing gold having a thickness of 200 Å on a surface of a film, an area in the range of 2 microns×2 microns is measured in an ambient atmosphere under such conditions that a voltage applied between a surface being measured and a metallic probe is 0.8 V, and a tunnel current is 0.5 mA. A portion free from the small protuberances (A) is selected, and a portion of a measuring length L is taken out in a direction of the center line from a curve of a film surface roughness. The center line of that portion is set at X axis and the direction of the longitudinal magnification at Y axis. A curve of roughness is indicated by $Y=f(X)$. A value found by the following formula is indicated with a unit nm.

$$Ra^s = \frac{1}{L} \int_0^L |f(x)|dx$$

A value found about a length of 0.4 to 1.2 microns in a portion free from the small protuberances (A) and the large protuberances (B) is made one measured value; the fine surface roughness $Ra^s$ is an average of 10 measured values.

(6) Surface roughness - Ra (Center line average):

According to JIS B0601, a chart is drawn using SE-3FAT (a high precision surface roughness measuring instrument manufactured by Kosaka Laboratories Co., Ltd.) under such conditions that a radius of a needle is 2 micrometers, a load 30 mg, a magnification 200,000× and a cut-off value 0.08 mm. From a curve of a film surface roughness, a portion of a measuring length L is taken out in a direction of the center line. The center line of that portion is set at X axis, and the direction of the longitudinal magnification at Y axis. A curve of roughness is found by $Y=f(x)$. A value found by the following formula is indicated with a unit micrometer.

$$Ra = \frac{1}{L} \int_0^L |f(x)|dx$$

The measurement is repeated four times with a reference length of 1.25 mm, and the surface roughness is an average of the four measured values.

(7) Coefficient of friction (film slipperiness):

In accordance with ASTM D1894-63, a coefficient of static friction ($\mu s$) is measured using a slipperiness measuring instrument of Toyo Tester K. K. A sled is a glass plate, and a load is 1 kg.

Slipperiness of the film is estimated with the following grades.

○: good ($\mu s<0.6$)
Δ: slightly poor ($\mu s=0.6-0.8$)
×: poor ($\mu s>0.8$)

(8) Running durability:

FIG. 1 is a rough sketch of a device for estimating runnability of a film. In the drawing, 1 is a feed reel; 2 a tension controller; 3, 5, 6, 8, 9 and 11 free rollers; 4 a tension detector (inlet); 7 a chromeplated fixed pin (5 mm$\phi$); 10 a tension detector (outlet); 12 a guide roller; and 13 a take-up reel.

As shown in FIG. 1, the film is contacted with the fixed pin 5 mm in outer diameter with an angle $\theta = (152/180) \pi$ radian (152°) in an atmosphere of 20° C. and 60% RH, and is moved and rubbed at a rate of 3.3 cm/sec. The tension roller 2 is controlled such that the inlet tension ($T_1$) becomes 30 g. The film is run at 10 m, rewound, and then run. Running and rewinding are set at one stroke.

1) Abrasion resistance:

It is observed whether a deposit is found on the fixed pin after running with 30 strokes, and evaluation is conducted as follows.

○: A deposit is little found.
Δ: A deposit is somewhat found.
×: A large amount of a deposit is found.

2) Scratch resistance:

The friction state (degree of scrach occurrence) of the film surface after running with 30 strokes is observed, and evaluation is conducted as follows.

○: Scratching is little observed.
×: Scratching notably occurs.

(9) Electromagnetic conversion characteristics (I):

High density recording characteristics, especially, noise level is evaluated from an S/N (dB) ratio in 10 KBPI recording and playback and a rate of decrease of output in 50 KBPI recording and playback relastive to output in 10 KBPI recording and playback.

S/N (dB) in 10 KBPI recording and playback
○: 40 dB or more
×: less than 40 dB
Rate of decrease of output
A = (output in 10 KBPI recording and playback)- /(output in 50 KBPI recording and playback)
○: A is less than 10.
×: A is 10 or more.

(10) Tape runnability:

Fluctuation of a screen owing to irregular running of a tape is observed when recording and playback are repeated using a commercial 8 mm VTR under two conditions of normal temperature/normal humidity and high temperature/high humidity. Evaluation is effected as follows.

○: Running is good with no fluctuation of the playback screen.
×: Running is often delayed and fluctuation of the playback screen occurs.

(11) Scuff resistance (adhesion):

Occurrence of scuff is observed on a tape thin film after running is repeated 100 times under two conditions of normal temperature/normal humidity and high temperature/high humidity. Evaluation is effected as follows.

⊚: Occurrence of scuff is little observed on the surface of the tape thin film.
○: Occurrence of very weak scuff is a bit observed on the surface of the tape thin film.
×: Occurrence of serious scuff is observed on the surface of the tape thin film.

By the way, the normal temperature and the normal humidity are 25° C. and 60% RH, and the high temperature and the high humidity are 40° C. and 80% RH.

(12) Electromagnetic conversion characteristics (II):

Using a vacuum deposition device, a film is applied to a 1 m$\phi$ tubular can, and a Co-Ni alloy (containing 20% by weight of Ni) is obliquely deposited in oxygen of $5 \times 10^{-5}$ torr with the minimum angle of incidence of 43° to form a sample tape.

The tape is processed to a width of 8 mm to form a deposited tape. Comparison is made with C/N (initial value) of a white peak of 0.45 micrometer and a band width of 9 (MHz) through an amorphous head having a gap length of 0.2 micrometer.

Evaluation is made from C/N as follows.
○: +0.0 dB or more relative to the reference value
Δ: −0.5 dB to +0.0 dB relative to the reference value
×: less than −0.5 dB relative to the reference value Further, comparison is made from C/N (durability) after repeating recording and playback at 40° C. and 80% RH.

Evaluation is made from C/N.
○: +0.0 dB or more relative to the reference value
Δ: −1.0 dB to +0.0 dB relative to the reference value
×: less than −1.0 dB relative to the reference value

(13) Still characteristics:

An image signal of 4.2 MHz is recorded on the deposited tape, and a time is measured that lapses until the playback output is decreased to 50%. Evaluation is effected as follows depending on the time.

○: The time is 100 minutes or more.
Δ: The time is 50–100 minutes.
×: The time is less than 50 minutes.

EXAMPLE 1

A reaction vessel was charged with 100 parts of dimethyl terephthalate, 70 parts of ethylene glycol, 0.019 part of manganese acetate tetrahydrate and 0.013 part of sodium acetate trihydrate. While gradually elevating the inner temperature from 145° C., transesterification reaction was performed. When the transesterification reaction rate reached 95%, 0.044 part of a glycol solution of a phosphorus compound formed by reacting 25 parts of trimethyl phosphate with 75 parts of ethylene glycol. Further, 0.011 part of a solution (a titanium content 11% by weight) prepared by reacting 0.8 part of trimellitic anhydride with 0.65 part of tetrabutyl titanate in 2.5 parts of ethylene glycol was added as a polymerization catalyst. Then, the reaction product was moved to a polymerization vessel where polycondensation reaction was conducted at a high temperature (a final inner temperature 290° C.) in vacuo. There resulted polyethylene terephthalate having intrinsic viscosity of 0.60.

Polyethylne terephthalate was melt-extruded in a usual manner, and quenched to form a 131 micrometer-thick unstretched film. Subsequently, the unstretched film was sequentially stretched biaxially, i.e., longitudinally 3.6× at 90° C. and transversely 3.7× at 105° C., followed by conducting heat-setting at 230° C. for 30 seconds. A biaxially oriented film having a thickness of 9.8 micrometers was thus prepared.

On that occasion, the coating solution of the following composition was coated on the surfaces (P) and (Q) of the monoaxially stretched film before transverse stretching by a roll coating method. The surface (P) is a surface on which a magnetic layer is formed, and the surface (Q) is a surface on which a slippery surface is formed.

Composition of the coating solution of the film surface (P):
 Solution containing 1.5% by weight of an acryl-polyester resin (Pesresin SH551A: a trademark for a product of Takamatsu Oil & Fat Co., Ltd.)—83.5 parts
 Solution containing 1.5% by weight of polymethyl methacrylate fine particles (Eposter MA: a trademark for a product of Nippon Shokubai Kagaku Kogyo Co., Ltd.)—[An average particle size of the fine particles is 0.03 micrometer.]—1.5 parts
 Solution containing 1.5% by weight of polyoxyethylenenonylphenyl ether (NS208.5: a trademark for a product of Nippon Oils & Fats Co., Ltd.)—15 parts The amount of the coating solution is 2.7 g/m$^2$ on the wet basis.

Composition of the coating solution of the film surface (Q):
 Solution containing 2.1% by weight of an acryl-polyester resin (Pesresin SH551A)—54.7 parts
 Solution containing 2.1% by weight of a cellulose resin (Methyl Cellulose SM15: a trademark for a product of The Shin-Etsu Chemical Co., Ltd.)—24.3 parts
 Solution containing 2.1% by weight of polymethyl methacrylate fine particles (Eposter MA) [An average particle size of the fine particles is 0.03 micrometer.]—9.0 parts
 Solution containing 2.1% by weight of polyoxyethylenenonylphenyl ether (NS208.5) [An average particle size of the fine particles is 0.03 micrometer.]—12.0 parts The amount of the coating solution is 4.0 g/m$^2$ on the wet basis.

Using a vacuum deposition device, the polyester film was applied to a 1 m$\phi$ tubular can, and a Co-Ni alloy (containing 20% by weight of Ni) was obliquely deposited to a film thickness of about 1,500 A in oxygen of $5\times10^{-5}$ torr with the minimum angle of incidence of 43°. Subsequently, the deposited film was slit to a width of 8 mm to form a magnetic tape.

The properties of the polyester film and the magnetic recording medium with the magnetic layer formed on the film surface (P) are shown in Table 1.

EXAMPLE 2

A polyester film and a magnetic recording medium were obtained as in Example 1 except that 0.03 part of an ethylene glycol slurry of silicon dioxide having an average particle size of 0.10 micrometer (a 10 wt. % silicon dioxide/ethylene glycol slurry) was added when the inner temperature in the transesterification reaction reached 190° C., and the coating solution coated on the film surface (P) was changed as follows.

Composition of the coating solution coated on the film surface (P):
 Solution containing 0.7% by weight of a polyester resin (Plascoat Z-461: a trademark for a product of Goô Chemical IND. Co., Ltd.)—55.0 parts
 Solution containing 0.7% by weight of polymethyl methacrylate (Eposter MA) [An average particle size of the fine particles is 0.03 micrometer.]—30.0 parts
 Solution containing 0.7% by weight of polyoxyethylenenonylphenyl ether (NS240: a trademark for a product of Nippon Oils & Fats Co., Ltd.)—15.0 parts The amount of the coating solution is 2.7 g/m$^2$ on the wet basis.

The properties of the polyester film and the magnetic recording medium are shown in Table 1.

EXAMPLE 3

Manganese salicylate (0.021 part) and 0.005 part of potassium acetate were added to a mixture of 100 parts of dimethyl 2,6-naphthalenedicarboxylate and 60 parts of ethylene glycol, and 0.007 part of titanium oxalate was further added. While the temperature was gradually elevated from 150° C. to 240° C., transesterification reaction was carried out. When the transesterification reaction rate reached 93%, 0.032 part of a reaction mixed solution of 25 parts of trimethyl phosphate and 75 parts of ethylene glycol was added as a stabilizer at a liquid temperature of 140° C. Further, 0.130 part an ethylene glycol slurry of silicon dioxide having an average particle size of 0.010 micrometer (a 10 wt. % silicon dioxide/ethylene glycol slurry was added. Subsequently, the reaction product was moved to a polymerization vessel where polycondensation reaction was carried out at a high temperature in vacuo (a final inner temperature 280° C.). There resulted polyethylene-2,6-naphthalate having intrinsic viscosity of 0.57.

Polyethylene-2,6-naphthalate was melt extruded in a usual manner, and quenched to form a 78 micrometer-thick unstretched film. Then, the unstretched film was sequentially stretched biaxially, i.e., longitudinally 4.0$\times$ at 135° C. and transversely 5.0$\times$ at 145° C., and further heat-set at 200° C. for 30 seconds to form a 4.0 micrometer-thick biaxially oriented film.

On that occasion, the coating solution of the following composition was coated onto the surfaces (P) and (Q) of the monoaxially stretched film before transverse stretching by a roll coating method. The surface (P) is a surface on which a magnetic layer is formed, and the surface (Q) is a surface on which a slippery surface is formed.

Composition of the coating solution coated on the film surface (P):
 Solution containing 0.7% by weight of a polyester resin (Polyester WR961: a trademark for a product of Nippon Synthetic Chemical Industry Co., Ltd.)—30.0 parts
 Solution containing 0.7% by weight of an acryl-polyester resin (Pesresin SH551A)—35.0 parts
 Solution containing 0.7% by weight of collidal silica (Cataloid-SN: a trademark for a product of Catalysts & Chemicals Industries Co., Ltd.)—5.0 parts
 Solution containing 0.7% by weight of polyoxyethylenenonylphenyl ether (NS240)—30.0 parts The amount of the coating solution is 3.8 g/m$^2$ on the wet basis.

Composition of the coating solution coated on the film surface (Q):
 Solution containing 2.0% by weight of an acryl-polyester resin (Pesresin SH551A)—54.7 parts
 Solution containing 2.0% by weight of a cellulose resin (Methyl Cellulose SM-15)—24.3 parts
 Solution containing 2.0% by weight of colloidal silica (Cateloid-SI-350: a trademark for a product of Catalysts & Chemicals Industries Co., Ltd.)—11.0 parts
 Solution containing 2.0% by weight of polyoxyethylenenonylphenyl ether (NS208.5)—10.0 parts The amount of the coating solution is 5.6 g/m$^2$ on the wet basis.

The properties of the polyester film and the magnetic recording medium with the magnetic layer formed on the film surface (P) as in Example 1 are shown in Table 1.

EXAMPLE 4

A mixture of 100 parts of bis-beta-hydroxyethyl terephthalate, 65 parts of terephthalic acid and 29 parts of ethylene glycol was esterified at a temperature of 210 to 230° C. When the amount evaporated of water resulting from the reaction became 13 parts, the reaction was terminated, and 0.0067 part, per 100 parts of the reaction product, of titanium acetate was added. The reaction product was then moved to a polymerization vessel where polycondensation reaction was carried out at a high temperature (a final inner temperature 285° C.) in vacuo. There was obtained polyethylene terephthalate having intrinsic viscosity of 0.60.

Polyethylene terephthalate was melt-extruded in a usual manner, and quenched to form a 131 micrometer-thick unstretched film. Then, the unstretched film was sequentially stretched biaxially, i.e., longitudinally 3.6× at 90° C. and transversely 3.7× at 105° C., and further heat-set at 230° C. for 30 seconds to form a 9.8 micrometer-thick biaxially oriented film.

At that time, the coating solution of the following composition was coated on the surfaces (P) and (Q) of the monoaxially stretched film before transverse stretching. The surface (P) is a surface on which a magnetic layer is formed, and the surface (Q) is a surface on which a slippery surface is formed.

Composition of the coating solution coated on the film surface (P):
  Solution containing 1.5% by weight of an acryl-polyester resin (Pesresin SH551A)—69.9 parts
  Solution containing 1.5% by weight of polymethyl methacrylate fine particles (Eposter MA) [An average particle size of the fine particles is 0.03 micrometer.]—0.1 part
  Solution containing 1.5% by weight of polyoxyethylenenonylphenyl ether (NS240)—30.0 parts The amount of the coating solution is 1.9 g/m$^2$ on the wet basis.

Composition of the coating solution coated on the film surface (Q):
  Solution containing 3.0% by weight of an acryl-polyester resin (Pesresin SH551A)—56.7 parts
  Solution containing 3.0% by weight of a cellulose resin (Methyl Cellulose SM-15)—24.3 parts
  Solution containing 3.0% by weight of polymethyl methacrylate fine particles (Eposter MA) [An average particle size of the fine particles is 0.035 micrometer.]—9.0 parts
  Solution containing 3.0% by weight of polyoxyethylenenonylphenyl ether (NS208.5)—10.0 parts The amount of the coating solution is 4.0 g/m$^2$ on the wet basis.

The properties of the polyester film and the magnetic recording medium with the magnetic layer formed on the surface (P) of the film as in Example 1 are shown in Table 1.

EXAMPLE 5

A polyester film was formed as in Example 1 except that the composition of the coating solution coated on the film surface (P) was changed as follows.

Composition of the coating solution coated on the film surface (P):
  Solution containing 60% by weight of a polyester resin (Polyester WR961)—83.5 parts
  Solution containing 6.0% by weight of polymethyl methacrylate fine particles (Eposter MA) [An averasge particle size of the fine particles is 0.06 micrometer]—1.5 parts
  Solution containing 6.0% by weight of polyoxyethylenenonylphenyl ether (NS240)—15.0 parts The amount of the coating solution is 4.0 g/m$^2$ on the wet basis.

The properties of the polyester film and the magnetic recording medium with the magnetic layer formed on the film surface (P) as in Example 1 are shown in Table 1.

COMPARATIVE EXAMPLE 1

A polyester film was obtained as in Example 1 except that the composition of the coating solution coated on the film surface (P) was changed as follows.

Composition of the coating solution coated on the film surface (P):
  Solution containing 1.5% by weight of an acryl-polyester resin (Pesresin SH551A)—83.5 parts
  Solution containing 1.5% by weight of polymethyl methacrylate fine particles (Eposter MA) [An average particle size of the fine particles is 0.06 micrometer]—1.5 parts
  Solution containing 1.5% by weight of polyoxyethylenenonylphenyl ether (NS240)—15.0 parts The amount of the coating solution is 2.7 g/m$^2$ on the wet basis.

The properties of the polyester film and the magnetic recording medium with the magnetic layer formed on the film surface (P) as in Example 1 are shown in Table 1.

COMPARATIVE EXAMPLE 2

A polyester film was obtained as in Example 1 except that the composition of the coating solution coated on the film surface (P) was changed as follows.

Composition of the coating solution coated on the film surface (P):
  Solution containing 4.7% by weight of an acryl-polyester resin (SH551A)—83.5 parts
  Solution containing 4.7% by weight of polymethyl methacrylate fine particles (Eposter MA) [An average particle size of the fine particles is 0.03 micrometer]—1.5 parts
  Solution containing 4.7% by weight of polyoxyethylenenonylphenyl ether (SN240)—15.0 parts The amount of the coating solution is 2.7 g/m$^2$ on the wet basis.

The properties of the polyester film and the magnetic recording medium with the magnetic layer formed on the film surface (P) as in Example 1 are shown in Table 1.

COMPARATIVE EXAMPLE 3

One hundred parts of dimethyl terephthalate, 70 parts of ethylene glycol, 0.019 part of manganese acetate tetrahydrate, and 0.013 part of sodium acetate trihydrate were charged into a reaction vessel. While gradually elevating the inner temperature from 145° C., transesterification reaction was carried out. When the transesterification reaction rate reached 95%, 0.044 part of a glycol solution of a phosphorus compound prepared by reacting 25 parts of trimethyl phosphate with 75 parts of ethylene glycol was added as a stabilizer. Further, 0.011 part of a solution (a titanium content 11% by weight) formed by reacting 0.8 part of trimellitic anhydride and 0.65 part of tetrabutyl titanate in 2.5 parts of ethylene glycol was added as a polymerization catalyst. Then, the reaction product was moved to a polymerization vessel where polycondensation reaction was conducted at a high temperature (a final inner temperature 290° C.) in vacuo. There resulted polyethylene terephthalate having intrinsic viscosity of 0.60.

Polyethylene terephthalate was melt-extruded in a usual manner and quenched to form a 131 micrometer-thick unstretched film. Subsequently, the unstretched film was sequentially stretched biaxially, i.e., longitudinally 3.6× at 90° C. and transversely 3.7 times at 105° C., and further heat-set at 200° C. for 30 seconds to prepare a 9.8 micrometer-thick biaxially oriented film.

On that occasion, the coating solution of the following composition was coated on the surfaces (P) and (Q) of the monoaxially stretched film before transverse stretching by a roll coating method. The surface (P) is a surface on which a magnetic layer is formed, and the surface (Q) is a surface on which a smooth surface is formed.

Composition of the coating solution coated on the film surface (P):
  Solution containing 1.3% by weight of an acryl-polyester resin (Pesresin SH551A)—83.0 parts
  Solution containing 1.3% by weight of polymethyl methacrylate (Eposter MA) [An average particle size of the fine particles is 0.03 micrometer]—2.0 parts
  Solution containing 1.3% by weight of polyoxyethylenenonylphenyl ether (NS208.5)—15 parts The amount of the coating solution is 2.7 g/m² on the weight basis.

Composition of the coating solution coated on the film surface (Q):
  Solution containing 2.1% by weight of an acryl-polyester resin (Pesresin SH551A)—54.7 parts
  Solution containing 2.1% by weight of a cellulose resin (Methyl Cellulose SM-15)—24.3 parts
  Solution containing 2.1% by weight of polymethyl methacrylate fine particles (Eposter HA) [An average particle size of the fine particles is 0.03 micrometer]—9.0 parts
  Solution containing 2.1% by weight of polyoxyethylenenonylphenyl ether (NS208.5)—12.0 parts The amount of the coating solution is 4.0 g/m² on the wet basis.

The properties of the polyester film and the magnetic recording medium with the magnetic layer formed on the film surface (P) as in Example 1 are shown in Table 1.

COMPARATIVE EXAMPLE 4

A polyester film was obtained as in Example 2 except that the composition of the coating solution coated on the film surface (P) was changed as follows.

Composition of the coating solution coated on the film surface (P):
  Solution containing 1.5% by weight of an acrylic resin (PRIMAL AC-604: a trademark for a product of The Rohm & Haas Company)—85.0 parts
  Solution containing polymethyl methacrylate fine particles (Eposter MA) [An average particle size of the fine garticles is 0.03 micrometer]—5.0 parts
  Solution containing 1.5% by weight of polyoxyethylenenonylphenyl ether (NS240)—10.0 parts The amount of the coating solution is 2.7 g/m² on the wet basis.

The properties of the polyester film and the magnetic recording medium with the magnetic layer formed on the film surface (P) as in Example 1 are shown in Table 1.

COMPARATIVE EXAMPLE 5

A polyester film was obtained as in Example 2 except that the composition of the coating solution coated on the film surface (P) was changed as follows.

Composition of the coating solution coated on the film surface (P):
  Solution containing 0.7% by weight of an acryl-polyester resin (Pesresin SH551A)—5.0 parts
  Solution containing 0.7% by weight of an acrylic resin (PRIMAL AC-64: a trademark for a product of The Rohm and Haas Company)—10.0 parts
  Solution containing 0.7% by weight of polymethyl methacrylate fine particles (Eposter MA) [An average particle size of the fine particles is 0.03 micrometer.]—70.0 parts The amount of the coating solution is 2.7 g/m² on the wet basis.

The properties of the polyester film and the magnetic recording medium with the magnetic layer formed on the film surface (P) as in Example 1 are shown in Table 1.

COMPARATIVE EXAMPLE 6

A polyester film was obtained as in Example 2 except that 1.2 parts of an ethylene glycol slurry of calcium carbonate having an average particle size of 0.75 micrometer (a 10 wt. % calcium carbonate/ethylene glycol slurry) were added when the inner temperature in transesterification reaction reached 200° C., instead of adding 0.30 part of the 10 wt. % silicon dioxide/ethylene glycol slurry having the average particle size of 0.10 micrometer when the inner temperature in transesterification reaction reached 190° C.

The properties of the polyester film and the magnetic recording medium with the magnetic layer formed on the film surface (P) as in Example 1 are shown in Table 1.

COMPARATIVE EXAMPLE 7

A polyester film was obtained as in Example 1 except that the film surface (P) was not coated.

The properties of the polyester film and the magnetic recording medium with the magnetic layer formed on the film surface (P) as in Example 1 are shown in Table 1.

COMPARATIVE EXAMPLE 8

A polyester film was obtained as in Example 1 except that the composition of the coating solution coated on the film surface (P) was changed as follows.

Composition of the coating solution coated on the film surface (P):
  Solution containing 1.5% by weight of an acryl-polyester resin (Pesresin SH551A)—85.0 parts
  Solution containing 1.5% by weight of polyoxyethylenenonylphenyl ether (NS208.5)—15.0 parts The amount of the coating solution is 2.7 g/m² on the wet basis.

The properties of the polyester film and the magnetic recording medium with the magnetic layer formed on the film surface (P) as in Example 1 are shown in Table 1.

of trimellitic anhydride with 0.65 part of tetrabutyl titanate in 2.5 parts of ethylene glycol was added as a

TABLE 1

| | Properties of a deposited surface side | | | | | |
|---|---|---|---|---|---|---|
| | Protuberances containing particles as a nucleus (per mm²) | Height of Protuberances (nm) | Protuberances composed of a resin alone (per mm²) | Fine surface roughness Ra$^s$ (per nm) | Surface roughness Ra (μm) | Surface roughness of a slippery surface Ra (μm) |
| Example 1 | $3 \times 10^6$ | 9.0 | $8 \times 10^5$ | 1.0 | 0.001 | 0.004 |
| Example 2 | $1 \times 10^7$ | 9.2 | $8 \times 10^4$ | 0.7 | 0.001 | 0.004 |
| Example 3 | $4 \times 10^7$ | 6.2 | $5 \times 10^3$ | 0.8 | 0.002 | 0.005 |
| Example 4 | $5 \times 10^5$ | 11.1 | $6 \times 10^4$ | 0.9 | 0.002 | 0.006 |
| Example 5 | $2 \times 10^6$ | 4.0 | $1 \times 10^6$ | 0.9 | 0.002 | 0.004 |
| Comparative Example 1 | $4 \times 10^5$ | 40.0 | $8 \times 10^5$ | 1.0 | 0.002 | 0.004 |
| Comparative Example 2 | $1 \times 10^7$ | 6.0 | $9 \times 10^7$ | 1.5 | 0.003 | 0.005 |
| Comparative Example 3 | $3 \times 10^6$ | 8.8 | $3 \times 10^6$ | 1.3 | 0.002 | 0.004 |
| Comparative Example 4 | $7 \times 10^6$ | 7.0 | $9 \times 10^7$ | 1.0 | 0.003 | 0.005 |
| Comparative Example 5 | $2 \times 10^9$ | 4.3 | $2 \times 10^2$ | 0.4 | 0.001 | 0.004 |
| Comparative Example 6 | $1 \times 10^7$ | 9.2 | $8 \times 10^4$ | 1.3 | 0.017 | 0.018 |
| Comparative Example 7 | — | 0 | — | 0.3 | 0.001 | 0.004 |
| Comparative Example 8 | — | 0 | $8 \times 10^5$ | 1.0 | 0.001 | 0.004 |

| | | Running durability | | Magnetic recording medium | | | |
|---|---|---|---|---|---|---|---|
| | | | | Electromagnetic conversion characteristics (I) | | | |
| | Coefficient of friction of a film | Abrasion resistance | Scratch resistance | S/N | Rate of decrease of output | Tape runnability | Scuff resistance |
| Example 1 | ○ | ○ | ○ | ○ | ○ | ○ | ○ |
| Example 2 | ○ | ○ | ○ | ○ | ○ | ○ | ◎ |
| Example 3 | ○ | ○ | ○ | ○ | ○ | ○ | ◎ |
| Example 4 | ○ | ○ | ○ | ○ | ○ | ○ | ○ |
| Example 5 | ○ | ○ | ○ | ○ | ○ | ○ | ○ |
| Comparative Example 1 | ○ | ○ | ○ | X | X | ○ | ○ |
| Comparative Example 2 | ○ | ○ | ○ | X | X | ○ | ◎ |
| Comparative Example 3 | ○ | ○ | ○ | X | X | ○ | ○ |
| Comparative Example 4 | ○ | ○ | ○ | X | X | ○ | ○ |
| Comparative Example 5 | ○ | Δ | ○ | X | X | ○ | ◎ |
| Comparative Example 6 | ○ | ○ | ○ | X | X | ○ | ◎ |
| Comparative Example 7 | X | Δ | X | ○ | X | X | X |
| Comparative Example 8 | X | X | X | ○ | X | X | X |

EXAMPLE 6

One hundred parts of dimethyl terephthalate, 70 parts of ethylene glycol, 0.019 part of manganese acetate tetrahydrate and 0.013 part of sodium acetate trihydrate were charged into a reactor. While gradually elevating the inner temperature from 145°, transesterification reaction was performed. When the transesterification reaction rate reached 95%, 0.044 part of a glycol solution of a phosphorus compound prepared by reacting 25 parts of trimethyl phosphate and 75 parts of ethylene glycol was added as a stabilizer. Further, 0.19 part of an ethylene glycol slurry of silicon dioxide having an average particle size of 0.10 micrometer (a 10 wt. % silicon dioxide/ethylene glycol slurry) was added. After fully stirring the mixture, 0.011 part of a solution (a titanium content 11% by weight) prepared by reacting 0.8 part of trimellitic anhydride with 0.65 part of tetrabutyl titanate in 2.5 parts of ethylene glycol was added as a polymerization catalyst. Then, the reaction product was moved to a polymerization vessel where polycondensation reaction was conducted at a high temperature (a final inner temperature 290° C.) in vacuo. There resulted polyethylene terephthalate having intrinsic viscosity of 0.60.

Polyethylene terephthalate was melt-extruded in a usual manner and quenched to form a 131 micrometer-thick unstretched film. Then, the unstretched film was sequentially stretched biaxially, i.e., longitudinally 3.6× at 90° C. and transversely 3.7× at 105° C., and further heat-set at 230° C. for 8 seconds to form a 9.8 micrometer-thick biaxially oriented film. At this time, the coating solution of the following composition was coated on the surfaces (P) and (Q) of the monoaxially stretched film before transverse stretching by a roll coating method. The surface (P) is a surface on which a magnetic layer is formed and the surface (B) is a surface on which a slippery surface is formed.

Composition of the coating solution coated on the film surface (P):

Solution containing 1.5% by weight of an acryl-polyester resin (Pesresin SH551A)—82.5 parts
Solution containing 1.5% by weight of polymethyl methacrylate fine particles (Eposter MA) [An average particle size of the fine particles is 0.03 micrometer]—2.5 parts
Solution containing 1.5% by weight of polyoxyethylenenonylphenyl ether (NS240)—15 parts The amount of the coating solution is 2.7 g/m² on the wet basis.

Composition of the coating solution coated on the film surface (Q):

Solution containing 2.1% by weight of an acryl-polyester resin (Pesresin SH551A)—55.7 parts
Solution containing 2.1% by weight of a cellulose resin (Methyl Cellulose SM-15)—24.3 parts
Solution containing 2.1% by weight of polymethyl methacrylate fine particles (Eposter MA) [An average particle size of the fine particles is 0.03 micrometer]—9.0 parts
Solution containing 2.1% by weight of polyoxyethylenenonylphenyl ether (NS208.5)—11.0 parts The amount of the coating solution is 4.0 g/m² on the wet basis.

The properties of the polyester film and the magnetic recording medium with the magnetic layer formed on the film surface (P) as in Example 1 are shown in Table 1.

EXAMPLE 7

Manganese salicylate (0.021 part) and 0.005 part of potassium acetate were added to a mixture of 100 parts of dimethyl 2,6-naphthalenedicarboxylate and 60 parts of ethylene glycol, and 0.007 part of titanium oxalate was further added. While gradually elevating the temperature from 150° C. to 240° C., transesterification reaction was carried out. When the transesterification reaction rate reached 93%, 0.032 part of a mixture prepared by reacting 25 parts of trimethyl phosphate with 75 parts of ethylene glycol was added as a stabilizer at a liquid temperature of 240° C. Further, 0.30 part of an ethylene glycol slurry of silicon dioxide having an average particle size of 0.10 micrometer (a 10 wt. % silicon dioxide/ethylene glycol slurry) was added. Then, the reaction product was moved to a polymerization vessel where polycondensation reaction was carried out at a high temperature (a final inner temperature 280° C.) in vacuo. There resulted polyethylene-2,6-naphthalate having intrinsic viscosity of 0.57.

Polyethylene-2,6-naphthalate was melt-extruded in a usual manner and quenched to form a 120 micrometer-thick unstretched film. Then, the unstretched film was sequentially stretched biaxially, i.e., longitudinally 4.0× at 135° C. and transversely 5.0× at 150° C., and further heat-set at 210° C. for 10 seconds to obtain a 6.0 micrometer-thick biaxially oriented film. On this occasion, the coating solution of the following composition was coated on the surfaces (P) and (Q) of the monoaxially stretched film before transverse stretching. The surface (P) is a surface on which a magnetic layer is formed, and the surface (Q) is a surface on which a slippery surface is formed.

Composition of the coating solution coated the film surface (P):

Solution containing 1.5% by weight of an acryl-polyester resin (Pesresin SH55A)—84.0 parts
Solution containing 1.5% by weight of polymethyl methacrylate fine particles (Eposter MA) [An average particle size of the fine particles is 0.03 micrometer]—1.0 part
Solution containing 1.5% by weight of polyoxyethylenenonylphenyl ether (NS240)—15.0 parts The amount of the coating solution is 3.8 g/m² on the wet basis.

Composition of the coating solution coated on the film surface (Q):

Solution containing 2.0% by weight of an acryl-polyester resin (Pesresin SH551A)—54.7 parts
Solution containing 2.0% by weight of a cellulose resin (Methyl Cellulose SM-15)—24.3 parts
Solution containing 2.0% by weight of colloidal silica (Cataloid-SI-350)—11.0 parts
Solution containing 2.0% by weight of polyoxyethylenenonylphenyl ether (NS208.5)—10.0 parts The amount of the coating solution is 5.6 g/m² on the wet basis.

The properties of the polyester film and the magnetic recording medium with the magnetic layer formed on the film surface (P) are shown in Table 2.

EXAMPLE 8

One hundred parts of dimethyl terephthalate, 70 parts of ethylene glycol and 0.019 part of manganese acetate tetrahydrate were charged into a reaction vessel. While gradually elevating the inner temperature from 145° C., transesterification reaction was carried out. When the transesterification reaction rate reached 90%, 0.013 part of sodium acetate trihydrate was added, and transesterification reaction continued. When the transesterification reaction rate became 95%, 0.044 part of a glycol solution of a phosphorus compound prepared by reacting 25 parts of trimethyl phosphate with 75 parts of ethylene glycol was added as a stabilizer. Further, 0.01 part of a solution (a titanium content 11% by weight) prepared by reacting 0.8 part of trimellitie anhydride with 0.65 part of tetrabutyl titanate in 2.5 parts of ethylene glycol was added as a polymerization catalyst. Then, the reaction product was moved to a polymerization vessel where polycondensation reaction was performed at a high temperature (a final inner temperature 290° C.) in vacuo. There resulted polyethylene terephthalate (M) having intrinsic viscosity of 0.60.

One hundred parts of dimethyl terephthalate, 70 parts of ethylene glycol and 0.019 part of manganese acetate tetrahydrate were charged into a reactor. While gradually elevating the inner temperature from 145° C., transesterification reaction was carried out. When the transesterification reaction rate reached 97%, 0.100 part of a glycol solution of a phosphorus compound prepared by reacting 25 Darts of trimethyl phosphate with 75 parts of ethylene glycol was added as a stabilizer. Further, 0.011 part of a solution (a titanium content 11% by weight) formed by reacting 0.8 part of trimellitic anhydride with 0.65 part of tetrabutyl titanate in 2.5 parts of ethylene glycol was added as a polymerization catalyst. Five minutes later, 0.15 part of calcium carbonate having an average particle size of 0.30 micrometer was added, and the reaction product was moved to a polymerization vessel where polycondensation reaction was conducted at a high temperature (a final inner temperature 290° C.) in vacuo. There was obtained polyethylene terephthalate (N) having intrinsic viscosity of 0.65.

These polyethylene terephthalates (M) and (N) were melt-coextruded at a thickness ratio of 6:4 and quenched to form a 96 micrometer-thick unstretched film. At that time, polyethylene terephthalate (M) was mixed with 0.020 part of silicon dioxide having an average particle size of 0.08 micrometer with a twin-screw extruder.

Subsequently, the unstretched film was sequentially stretched biaxially, i.e., longitudinally 3.6× at 95° C. and transversely 3.7× at 110° C., and further heat-set at 220° C. for 8 seconds to form a 7.1 micrometer-thick biaxially oriented film. On this occasion, the coating solution of the following composition was coated on the outer surfaces of polyethylene terephthalates (M) and (N) of the monoaxially stretched film before transverse stretching.

Composition of the coating solution coated on the outer surface of polyethylene terephthalate (M)
  Solution containing 1.5% by weight of a polyester resin (Plascoat RZ-358: a trademark for a product of Goo Chemical IND. Co., Ltd.)—84.2 parts
  Solution containing 1.5% by weight of polymethyl methacrylate fine particles (Eposter MA) [An average particle size of the fine particles is 0.025 micrometer]—0.8 part
  Solution containing 1.5% by weight of polyoxyethylenenonylphenyl ether (NS240)—15.0 parts The amount of the coating solution is 2.7 g/m² on the wet basis.

Composition of the coating solution coated on the outer surface of polyethylene terephthalate (N):
  Solution containing 2.1% by weight of an acryl-polyester resin (Pesresin SH551A)—54.7 parts
  Solution containing 2.1% by weight of a cellulose resin (Methyl Cellulose SM-15)—24.3 parts
  Solution containing 2.1% by weight of colloidal silica (Cataloid-SI-350)—11.0 parts
  Solution containing 2.1% by weight of polyoxyethylenenonylphenyl ether—10.0 parts The amount of the coating solution is 4.0 g/m² on the wet basis.

The properties of the polyester film and the magnetic recording medium with the magnetic layer formed on the film surface of polyethylene terephthalate (M) are shown in Table 2.

EXAMPLE 9

A mixture of 100 parts of bis-beta-hydroxylethyl terephthalate, 65 parts of terephthalic acid and 29 parts of ethylene glycol was heated at a temperature of 210° to 230° C. to conduct esterification reaction. When the amount evaporated of water formed by the reaction became 13 parts, said reaction was terminated, and 0.0067 part of titanium acetate per 100 parts of the reaction product was added. Then, 0.12 part of an ethylene glycol slurry of silicon dioxide having an average particle size of 0.08 micrometer (a 10 wt. % silicon dioxide/ethylene glycol slurry) was added. Then, the reaction product was moved to a polymerization vessel where polycondensation reaction was performed at a high temperature (a final inner temperature 285° C.) in vacuo. There resulted polyethylene terephthalate having intrinsic viscosity of 0.60.

Polyethylene terephthalate was melt-extruded in a usual manner and quenched to form a 131 micrometer-thick unstretched film. Then, the unstretched film was sequentially stretched biaxially, i.e., longitudinally 3.6× at 90° C. and transversely 3.7× at 105° C., and further heat-set at 230° C. for 7 seconds to form a 9.8 micrometer-thick biaxially oriented film. On this occasion, the coating solution of the following composition was coated on the film surfaces (P) and (Q) by a roll coating method. The surface (P) is a surface on which a magnetic layer is formed, and the surface (Q) is a surface on which a slippery surface is formed.

Composition of the coating solution coated on the film surface (P):
  Solution containing 1.5% by weight of an acryl-polyester resin (Pesresin SH551A)—81.0 parts
  Solution containing 1.5% by weight of silicon dioxide having an average particle size of 0.03 micrometer—4.0 parts
  Solution containing 1.5% by weight of polyoxyethylenenonylphenyl ether (NS240)—15.0 parts The amount of the coating solution is 1.4 g/m² on the wet basis.

Composition of the coating solution coated on the film surface (Q):
  Solution containing 3.0% by weight of an acryl-polyester resin (Pesresin SH551A)—56.7 parts
  Solution containing 3.0% by weight of a cellulose resin (Methyl Cellulose SM-15)—24.3 parts
  Solution containing 3.0% by weight of polymethyl methacrylate fine particles (Eposter MA) [An average particle size of the fine particles is 0.035 micrometer]—9.0 parts
  Solution containing 3.0% by weight of polyoxyethylenenonylphenyl ether—10.0 Darts The amount of the coating solution is 4.0 g/m² on the wet basis.

The properties of the polyester film and the magnetic recording medium with the magnetic layer formed on the film surface (P) are shown in Table 2.

COMPARATIVE EXAMPLE 9

Example 6 was repeated except that the amount of the 10 wt. % silicon dioxide/ethylene glycol slurry was changed from 0.19 part to 5.8 parts and the composition of the coating solution coated on the film surface (P) was changed as follows.

Composition of the coating solution coated on the film surface (P):
  Solution containing 1.5% by weight of an acryl-polyester resin (Pesresin SH551A)—80.5 parts
  Solution containing 1.5% by weight of polymethyl methacrylate fine particles [An average particle size of the fine particles is 0.03 micrometer]—4.5 parts
  Solution containing 1.5% by weight of polyoxyethylenenonylphenyl ether (NS240)—15.0 parts The amount of the coating solution is 2.7 g/m² on the wet basis.

The properties of the polyester film and the magnetic recording medium with the magnetic layer formed on the film surface (P) are shown in Table 2.

COMPARATIVE EXAMPLE 10

The composition of the coating solution coated on the film surface (P) was changed as follows in Example 6.

Composition of the coating solution coated on the film surface (P):
  Solution containing 1.5% by weight of a polyester resin (Plascoat Z-461)—51.3 parts Solution containing 1.5% by weight of silicon dioxide having an average particle size of 0.10 micrometer—33.7 parts Solution containing 1.5% by weight of polyoxyethylenenonylphenyl ether (NS240)—15 parts The amount of the coating solution is 2.7 g/m² on the wet basis.

The properties of the polyester film and the magnetic recording medium with the magnetic layer formed on the film surface (P) are shown in Table 2.

COMPARATIVE EXAMPLE 11

A polyester film was obtained as in Example 9 except that 0.12 part of the 10 wt. % silicon dioxide/ethylene glycol slurry was replaced with 6.0 parts of an ethylene glycol slurry of calcium carbonate having an average particle size of 0.30 micrometer (a 10 wt. % calcium carbonate/ethylene glycol slurry).

The properties of the polyester film and the magnetic recording medium with the magnetic layer formed on the film surface (P) are shown in Table 2.

COMPARATIVE EXAMPLE 12

The composition of the coating solution coated on the film surface (P) was changed as follows in Example 6.

Composition of the coating solution coated on the film surface (P):

Solution containing 4.0% by weight of an acrylpolyester resin (Pesresin SH551A)—84.46 parts Solution containing 4.0% by weight of silicon dioxide having an average particle size of 0.03 micrometer—0.54 part Solution containing 4.0% by weight of polyoxyethylenenonylphenyl ether (NS240)—15.0 parts The amount of the coating solution is 5.0 g/m² on the wet basis.

The properties of the polyester film and the magnetic recording medium with the magnetic layer formed on the film surface (P) are shown in Table 2.

COMPARATIVE EXAMPLE 13

A polyester film was obtained as in Example 6 except that 0.19 part of the 10 wt. % silicon dioxide/ethylene glycol slurry was replaced with 6.5 parts of calcium carbonate having an average particle size of 0.75 micrometer.

The properties of the polyester film and the magnetic recording medium with the magnetic layer formed on the film surface (P) are shown in Table 2.

TABLE 2

| | Properties of a deposited surface side | | | | | | |
|---|---|---|---|---|---|---|---|
| | Small protuberances (A) | | Large protuberances (B) | | Micro-protuberances (C) | | Surface roughness |
| | Number (per mm²) | Height nm | Number (per mm²) | Height nm | Number (per mm²) | $Ra^5$ nm | Ra (μm) |
| Example 6 | $5.5 \times 10^6$ | 9 | $1.3 \times 10^4$ | 20 | $5 \times 10^5$ | 0.95 | 0.001 |
| Example 7 | $2.3 \times 10^6$ | 10 | $2.3 \times 10^4$ | 23 | $6 \times 10^5$ | 1.00 | 0.003 |
| Example 8 | $2.8 \times 10^6$ | 7 | $2.8 \times 10^4$ | 15 | $1 \times 10^6$ | 0.90 | 0.001 |
| Example 9 | $4.5 \times 10^6$ | 11 | $1.6 \times 10^4$ | 21 | $4 \times 10^4$ | 0.75 | 0.001 |
| Comparative Example 9 | $1.0 \times 10^7$ | 10 | $4.0 \times 10^5$ | 20 | $5 \times 10^5$ | 0.95 | 0.002 |
| Comparative Example 10 | $2.0 \times 10^6$ | 80 | $1.3 \times 10^4$ | 20 | $6 \times 10^4$ | 0.80 | 0.002 |
| Comparative Example 11 | $4.5 \times 10^6$ | 11 | $1.5 \times 10^4$ | 90 | $4 \times 10^4$ | 0.75 | 0.001 |
| Comparative Example 12 | $5.5 \times 10^6$ | 5 | $1.3 \times 10^4$ | 18 | $7 \times 10^7$ | 2.00 | 0.002 |
| Comparative Example 13 | $5.5 \times 10^6$ | 9 | $1.2 \times 10^4$ | 100 | $5 \times 10^5$ | 1.10 | 0.017 |

| | Surface roughness of a slippery surface Ra (μm) | Coefficient of friction of a film | Electromagnetic conversion characteristics (II) | | Still characteristics |
|---|---|---|---|---|---|
| | | | Initial | after repeating 250 times | |
| Example 6 | 0.004 | ◯ | ◯ | ◯ | ◯ |
| Example 7 | 0.006 | ◯ | ◯ | ◯ | ◯ |
| Example 8 | 0.008 | ◯ | ◯ | ◯ | ◯ |
| Example 9 | 0.006 | ◯ | ◯ | ◯ | ◯ |
| Comparative Example 9 | 0.004 | ◯ | X | Δ | ◯ |
| Comparative Example 10 | 0.004 | ◯ | Δ | Δ | X |
| Comparative Example 11 | 0.004 | ◯ | X | X | Δ |
| Comparative Example 12 | 0.004 | ◯ | X | X | ◯ |
| Comparative Example 13 | 0.018 | ◯ | X | X | ◯ |

What we claim is:

1. A polyester film for use in a magnetic recording medium characterized in that a continuous thin film which contains a resin as a matrix and acts as a primer layer for a magnetic layer is coated on one surface of a support film composed of a polyester, and the surface of the continuous thin film has (A) small protuberances each containing particles with an average particle size of less than 0.06 micrometer as a nucleus and having a height of 13 nm or less, (B) large protuberances each containing particles with an average particle size of 0.06 micrometer or more as a nucleus and having a height of 30 nm or less, and (C) micro-protuberances composed of a matrix resin alone, the numbers, per mm$^2$ of the film, of these protuberances satisfying the formulas, $$An = 1.0 \times 10^4 - 1.0 \times 10^8/mm^2,$$

$$Bn = 0 - 4 \times 10^4/mm^2, \text{ and}$$

$$Cn \leq 4.0 \times 10^6/mm^2$$

wherein An is the number of the small protuberances, Bn is the number of the large protuberances, and Cn is the number of the microprotuberances, the fine surface roughness Ra$^s$ of the continuous thin film portion composed of the matrix resin alone being 1.10 nm or less, and the surface roughness Ra of the overall continuous thin film being 1 to 10 nm.

2. The polyester film of claim 1 wherein the continuous thin film forming a slippery surface is coated on the other surface of the polyester film, contains a cellulose resin and fine particles with an average particle size of 0.15 micrometer or less, and has the surface roughness Ra of 2 to 10 nm.

3. The polyester film of claim 1 wherein the polyester is a polyester produced by using an organotitanium compound as a polymerization catalyst.

4. The polyester film of claim 1 or 2 wherein the matrix resin is at least one resin selected from an acrylic resin, a polyester resin and an acryl-polyester resin.

5. A polyester film for use in a magnetic recording medium characterized in that a continuous thin film which contains a resin as a matrix and acts as a primer layer for a magnetic layer is coated on one surface of a support film composed of a polyester, and the surface of the continuous thin film has (A) small protuberances each containing particles with an average particle size of less than 0.06 micrometer as a nucleus and having a height of 13 nm or less, (B) large protuberances each containing particles with an average particle size of 0.06 micrometer or more as a nucleus and having a height of 30 nm or less, and (C) micro-protuberances composed of a matrix resin alone, the numbers, per mm$^2$ of the film, of these protuberances satisfying the formulas, $$An \geq 1.0 \times 10^6/mm^2,$$

$$Bn \geq 1.05 \times 10^4/mm^2,$$

$$An \leq -3.4 \times 10^2 \cdot Bn + 13.6 \times 10^6/mm^2, \text{ and}$$

$$Cn \leq 4.0 \times 10^6/mm^2$$

wherein An is the number of the small protuberances, Bn is the number of the large protuberances, and Cn is the number of the microprotuberances, the fine surface roughness Ra$^s$ of the continuous thin film portion composed of the matrix resin alone being 1.10 nm or less, and the surface roughness Ra of the overall continuous thin film being 1 to 10 nm.

6. The polyester film of claim 1 wherein the particles forming the small protuberances (A) are contained in the layer of the continuous thin film, and the particles forming the large protuberances (B) are contained in the polyester.

7. The polyester film of claim 5 or 6 wherein the continuous thin film forming a slippery surface is coated on the other surface of the polyester film, contains a cellulose resin and fine particles with an average particle size of 0.15 micrometer or less, and has the surface roughness Ra of 2 to 10 nm.

8. The polyester film of claim 5 or 6 wherein the polyester is a polyester produced by using an organotitanium compound as a polymerization catalyst.

9. The polyester film of claim 5 or 6 wherein the matrix resin is at least one resin selected from an acrylic resin, a polyester resin and an acryl-polyester resin.

10. The polyester film of claim 1 in which the resin is coated on the thin film in an amount of 0.001 to 1 g per m$^2$ of the film.

11. The polyester film of claim 5 in which the resin is coated on the thin film in an amount of 0.001 to 1 g per m$^2$ of the film.

* * * * *